(12) United States Patent
Lapace

(10) Patent No.: US 10,582,781 B2
(45) Date of Patent: Mar. 10, 2020

(54) MOUNTING DEVICE AND METHOD FOR CONNECTING TWO SUPPORT BEAMS

(71) Applicant: Interroll Holding AG, Saint'Antonino (CH)

(72) Inventor: Jean Michel Lapace, La Roche sur Yon (FR)

(73) Assignee: INTERROLL HOLDING AG (CH)

( * ) Notice: Subject to any disclaimer, the term of this patent is extended or adjusted under 35 U.S.C. 154(b) by 40 days.

(21) Appl. No.: 15/635,474

(22) Filed: Jun. 28, 2017

(65) Prior Publication Data

US 2018/0000260 A1 Jan. 4, 2018

(30) Foreign Application Priority Data

Jul. 1, 2016 (EP) ..................................... 16290126

(51) Int. Cl.
*A47F 1/04* (2006.01)
*A47F 5/00* (2006.01)
(Continued)

(52) U.S. Cl.
CPC ................ *A47F 1/04* (2013.01); *A47B 57/04* (2013.01); *A47B 57/045* (2013.01);
(Continued)

(58) Field of Classification Search
CPC ....... A47B 96/06; A47B 57/045; A47B 57/04; A47B 2230/0007; A47B 2230/0014;
(Continued)

(56) References Cited

U.S. PATENT DOCUMENTS

| 3,368,227 A | * | 2/1968 | Underdown Jr. ....... F16B 12/58 248/243 |
| 4,154,419 A | * | 5/1979 | Breidenbach ........ A47B 57/402 108/110 |
| 5,115,920 A | * | 5/1992 | Tipton ................... B65G 1/023 211/151 |
| 5,116,007 A | * | 5/1992 | Von Gunton .......... A47B 57/42 108/108 |

(Continued)

FOREIGN PATENT DOCUMENTS

| AU | 1149583 | 8/1984 |
| CH | 685954 | 11/1995 |

(Continued)

OTHER PUBLICATIONS

Canadian Office Action dated May 8, 2018.
European Search Report dated Jan. 9, 2017.
Chinese Office Action dated November 13, 2018.

*Primary Examiner* — Ko H Chan
(74) *Attorney, Agent, or Firm* — Gerald E. Hespos; Michael J. Porco; Matthew T. Hespos

(57) ABSTRACT

A mounting device (10) for connecting two support beams (20, 30, 40) of a rack has an attachment plate (11). The attachment plate (11) has a through-hole (14) arrangeable adjacent an opening (21) of a first (20) of the two support beams and at least one first engaging element (12) for engaging with a recess (31, 32) of a second (30; 40) of the two support beams when the attachment plate (11) is arranged with a first flat side (11C) facing the first support beam (20). The mounting device (10) further has an eccentric stud (15) insertable into the through-hole (14) of the attachment plate (11) and the opening (21) of the first support beam (20). Therein, turning the eccentric stud (15) adjusts a position of the first engaging element (12) in the recess (31, 32) of the second support beam (30; 40).

13 Claims, 4 Drawing Sheets

(51) Int. Cl.
*F16B 12/28* (2006.01)
*B65G 1/02* (2006.01)
*F16B 12/50* (2006.01)
*A47B 57/04* (2006.01)
*A47F 5/10* (2006.01)
*A47B 96/14* (2006.01)

(52) U.S. Cl.
CPC .............. *A47F 5/0043* (2013.01); *A47F 5/10* (2013.01); *B65G 1/02* (2013.01); *B65G 1/023* (2013.01); *F16B 12/28* (2013.01); *F16B 12/50* (2013.01); *A47B 96/1441* (2013.01); *A47B 2230/0007* (2013.01); *A47B 2230/0014* (2013.01)

(58) Field of Classification Search
CPC .......... A47B 96/1441; A47F 5/10; A47F 1/12; A47F 1/04; A47F 5/0043; B65G 1/08; B65G 1/023; B65G 1/02; F16B 7/0446; F16B 12/50; F16B 12/28
USPC ....................................................... 211/59.2
See application file for complete search history.

(56) References Cited

U.S. PATENT DOCUMENTS

| | | | |
|---|---|---|---|
| 5,295,591 A | 3/1994 | Slater | |
| 5,308,031 A * | 5/1994 | Evenson | E04B 2/7416 211/192 |
| 6,196,401 B1 * | 3/2001 | Brady | A47F 1/121 211/186 |
| 6,293,507 B1 * | 9/2001 | Gorniak | A47B 57/404 211/183 |
| 6,609,335 B1 | 8/2003 | Hyakkoku | |
| 6,626,407 B1 * | 9/2003 | Miller | A47B 57/42 211/192 |
| 7,217,058 B2 * | 5/2007 | Herb | E04B 9/127 403/230 |
| 8,459,472 B2 * | 6/2013 | Hofman | A47F 5/0815 211/106.01 |
| 8,919,580 B2 * | 12/2014 | Johnson | A47F 1/12 211/59.2 |

FOREIGN PATENT DOCUMENTS

| | | |
|---|---|---|
| EP | 0086761 A1 | 8/1983 |
| EP | 1374728 A1 | 1/2004 |
| WO | 2010060688 A3 | 6/2010 |

* cited by examiner

MOUNTING DEVICE AND METHOD FOR CONNECTING TWO SUPPORT BEAMS

BACKGROUND

1. Field of the Invention

The invention relates to a mounting device and method for connecting two support beams of a rack, in particular of a carton flow bed rack.

2. Related Art

Carton flow bed racks are used to store and/or distribute loads, in particular parcels, cartons, and/or other goods. Carton flow bed racks are characterized in that they comprise a load side from which the rack is loaded and an unload side from which the rack is unloaded. There are carton flow bed racks that are loaded and unloaded at the same side, and others that are loaded and unloaded at different, e.g. opposite, sides. Carton flow bed racks may comprise wheel tracks to transport loads from one side of the rack to the other side.

For enabling a stable support, e.g. of these wheel tracks and the loads, support beams are provided. In particular at edges of the rack, two support beams are connected to each other substantially perpendicular to each other. This connection of the support beams is vital for the carton flow bed rack, because it has to provide a substantial stability to resist heavy usage when loading and unloading loads onto and from the carton flow bed rack. Therefore, said connection of the support beams should provide sufficient strength and durability.

Furthermore, since each rack comprises a plurality of said edge-connections, it is advantageous if these connections may be established simply and quickly.

The problem relates to providing an improved connection for two support beams of a rack, in particular of a carton flow bed rack that requires increased stability.

SUMMARY

An aspect relates to a mounting device for connecting two support beams of a rack, in particular of a carton flow bed rack, comprising an attachment plate. The attachment plate comprises a through-hole arrangeable adjacent an opening of the first of the two support beams and at least one first engaging element for engaging with a recess of a second of the two support beams. The attachment plate is arranged with a first flat side facing the first support beam. The mounting device further comprises an eccentric stud insertable into the through-hole of the attachment plate and into the opening of the first support beam. Therein, turning the eccentric stud adjusts a position of the first engaging element in the recess of the second support beam.

The mounting device is used to establish a connection between the two support beams. In particular, the mounting device enables establishing a firm and/or stable connection of the two support beams in a substantially perpendicular manner. Preferably, the support beams are provided as substantially horizontally aligned support beams, namely side beams, end beams, front beams, back beams, and/or intermediate beams that support substantially horizontally aligned elements of the rack, in particular elements like shelves, trays, wheel tracks, and/or loads.

The mounting device is especially suitable to connect two support beams of a carton flow bed rack, since the mounting device provides a substantial durability, strength, and stability. Furthermore, the mounting device enables a simple and fast installation.

The mounting device comprises at least two elements, namely the attachment plate and the eccentric stud. The attachment plate may be provided with two flat sides arranged opposite from each other, namely the first flat side and a second flat side. The attachment plate may be implemented as a sheet, in particular a metal sheet that may be fixed to the first support beam with its first flat side facing the first support beam. The attachment plate may comprise two substantially flat surfaces, namely at its first and second flat sides, that are at least 10 times, preferable at least 50 times larger than the surfaces of all its other (small) sides, namely its lateral and/or upper/lower side(s).

The attachment plate may be substantially rectangular, wherein its four small lateral sides are aligned substantially horizontally and vertically when the mounting device is arranged in its operating position. In its operating position, the attachment plate connects the two support beams and fixes them to each other. By providing the attachment plate as a substantially flat sheet, the mounting device requires only minimal space. Therefore, the available space for the functionality of the rack is enlarged.

The through-hole pierces the attachment plate (and thus extends) from its first flat side to its second flat side. The through-hole may comprise a defined inner diameter corresponding to and/or interacting with an outer diameter of the eccentric stud.

The at least one first engaging element may be provided as a hook and/or as a protrusion protruding from the attachment plate, namely from the first lateral side of the attachment plate. The shape of the engaging element is designed to interact with the at least one recess of the second support beam. In particular, at least one outer dimension like a width and/or length of the engaging element may be designed to correspond to an inner dimension like a width and/or height of the recess of the second support beam. The engaging element may protrude from the attachment plate in a different direction than the extension direction of the through-hole of the attachment plate.

The attachment plate may be intended to be arranged at an end of the first support beam and at an end of the second support beam. These two ends of the two support beams may face each other, in particular the support beams may be substantially perpendicular.

The attachment plate is fixed to the first support beam by the eccentric stud inserted into and/or through the through-hole and into and/or through the opening of the first support beam. In its operating position, the eccentric stud supports at least the weight of the attachment plate.

In the operating position, the attachment plate may be arranged with its two flat sides in a substantially vertical plane. Thus, the through-hole is arranged in a substantially horizontal direction piercing the attachment plate. The eccentric stud is inserted into and through the through-hole along an insertion direction substantially corresponding to the extension direction of the through-hole.

The first support beam may comprise a plurality of openings that are all suitable to receive the eccentric stud at least partially and, thus, to support the mounting device at the first support beam. The opening of the first support beam may pierce the first support beam at least partially, thus allowing the eccentric stud to be arranged at least partially inside the opening. In the operating position of the mounting device, the opening of the first support beam is aligned with the though-hole of the attachment plate.

Similarly, the second support beam may comprise a plurality of recesses that are suitable to receive the at least one engaging element of the attachment plate. In the operating position of the mounting device, the recess of the second support beam is aligned with the engaging element of the attachment plate.

With the attachment plate fixed to the first support beam by the eccentric stud, the position of the at least one engaging element is also fixed relative to the first support beam. Therefore, the at least one first engaging element may support and/or carry the second support beam when engaged with its recess. In the operating position, the eccentric stud not only supports the weight of the attachment plate, but also of the second support beam, at least partially, via the attachment plate and the at least one first engaging element.

The eccentric stud may be turned when inserted into the through-hole and the opening of the first support beam. In its operating position, the eccentric stud may be arranged in at least two different positions, namely an unlocked position and a locked position. In its unlocked position, the first engaging element may be moved freely into and/or out of the recess of the second support beam. In its locked position, the position of the first engaging element is shifted from the unlocked position, so that the first engaging element may not be moved out of the recess of the second support beam anymore. In this locked position, the two support beams are mounted, attached, and/or fixed to each other.

The eccentric stud may be turned and/or switched between at least said two positions by turning the eccentric stud. Said turning may be achieved by spinning and/or turning the eccentric stud about its predetermined turning axis, e.g. about its insertion direction, which substantially corresponds and/or is parallel to the extension direction of the through-hole of the attachment plate. The turning movement of the eccentric stud may be similar to a screwing movement of a screw. The eccentric stud comprises at least an eccentric section that is eccentric with respect to the turning axis of the eccentric stud.

When moved from the locked position to its unlocked position and vice versa, the alignment and/or orientation of an eccentric section of the eccentric stud may shift between at least two different positions. The eccentric section comprises an eccentric outer diameter interacting with the through-hole of the attachment plate. In particular, when viewed upon against the insertion direction, the outer diameter at the eccentric section may be shaped similar to an ellipsoid, wherein the radius of the ellipsoid is measured from a turning axis corresponding to the insertion direction. At least at one enlarged section, the radius of the ellipsoid is larger than at least at one small section. The turning axis is the axis that the eccentric stud is turned about when moving from the locked position into the unlocked position and vice versa. The position of the turning axis may be well defined by a center of the opening within the first beam and a mounting section of the eccentric stud comprising a substantially circular outer diameter.

In its operating position, the eccentric section of the eccentric stud comprising the eccentric outer diameter is arranged within the through-hole of the attachment plate. Turning the eccentric stud within the through-hole adjusts the alignment and/or orientation of the eccentric outer diameter of the eccentric stud within the through-hole. Therefore, shifting the position of the eccentric stud within the through-hole may shift the position of the attachment plate relative to the opening of the first support beam and, thus, relative to the first support beam. In particular, turning the eccentric stud may result in lifting and/or lowering the attachment plate relative to the first support beam, depending on the turning direction. Thereby, the relative position of the first engaging element relative to the first support beam may be altered and or adjusted.

The mounting device enables a simple and quick installation of the rack. The elements of the mounting device may be provided as metallic elements to provide sufficient stability. In particular, the attachment plate may be provided as single piece comprising the engaging element and the through-hole. Therefore, also the elements of the mounting device may be produced in a simple manner. The fixation of the two support beams by a single turn of the eccentric stud simplifies the installation, including later adjustments and/or tuning of the height and/or position. Summarizing, the mounting device improves the connection between the two support beams.

According to an embodiment, the through-hole comprises a section with a reduced inner diameter interacting with an eccentric outer diameter of the eccentric stud inserted into the through-hole. The through-hole may be provided as substantially circular hole providing sufficient space for the eccentric section of the eccentric stud. However, at at least one section of the through-hole, the through-hole comprises the reduced inner diameter, e.g. a protrusion limiting the size of the through-hole at this section. The section with the reduced diameter may comprise dimensions insufficient to interact with and/or engage a smaller end of the eccentric section of the eccentric stud. However, the section with the reduced diameter will interact and/or engage with the larger end of the eccentric section.

According to an embodiment, the first engaging element is arranged at a first lateral side of the attachment plate. Therein, the first engaging element protrudes from the first lateral side and out of said first lateral side of the attachment plate. The first engaging element may protrude from the attachment plate within the plane in which the attachment plate is arranged in. In other word, the first engaging element may be part of the sheet out of which the attachment plate is formed.

The first lateral side may be a side of the attachment plate that is arranged substantially vertically in the operating position of the mounting device. The first lateral side may be arranged at the end of the first support beam facing the second support beam, and, thus, facing the direction of the edge area at which the two support beams are connected to each other. Herein, the first engaging element may protrude from the attachment plate in a direction that is substantially perpendicular to the extension direction of the through-hole. Therefore, this configuration is especially suited to support two support beams that are connected substantially perpendicular to each other.

In a further development of this embodiment, at least one second engaging element is arranged at a second lateral side of the attachment plate, and the second engaging element is for engaging with the recess of the second support beam when the attachment plate is arranged with a second flat side facing the first support beam. Here, the attachment plate is versatile in that it may be attached to the first support beam either with its first flat side facing the first support beam or with its second flat side facing the first support beam. Depending on the orientation of the attachment plate, namely upon which of its flat sides faces the first support beam, either the at least one first engaging element may be used to engage the recess of the second support beam, or the at least one second engaging element may be used to engage the recess of the second support beam. The first engaging element and the second engaging element may be arranged at opposite lateral sides of the attachment plate. This embodiment further simplifies the installation of the mounting device in that the attachment plate may be attached to the first support beam by either of its two flat sides.

In a further development of this embodiment, the second engaging element, which is arranged on the second lateral side of the attachment plate, is arranged at a different height than the first engaging element, which is arranged on the first lateral side of the attachment plate. Herein, the respective heights are compared in an operating position of the attachment plate. Thus, the first engaging element will protrude from the first lateral side at a different vertical height than the second engaging element protrudes from the attachment plate when the second flat side of the attachment plate is facing the first support beam. This asymmetry enables different building heights and/or installation heights of the second support beam with respect to the first support beam.

In some embodiments, at least one third engaging element and/or at least one fourth engaging element may be arranged at an upper and/or a lower side of the attachment plate. Herein, all the different engaging elements may be arranged at different heights, thus enabling up to four different building heights and/or installation heights for the second support beam.

According to an embodiment, the attachment plate comprises two first engaging elements for engaging with two recesses of the second support beam, wherein the two engaging means are spaced from each other, e.g. spaced along the first lateral side of the attachment plate. Arranging two first engaging elements with two recesses of the second support beam further stabilizes the connection between the two support beams. When the eccentric stud is turned within the through-hole, the position of both the first engaging elements is adjusted synchronously. Providing two first engaging elements at different positions on the first lateral side further enables choosing the installation height of the second support beam by choosing which of the two first engaging elements to use to engage the recess of the second support beam. Here, a (e.g. further) selection choice is provided regarding the building/installation height of the second support beam. In the embodiment wherein a second engaging element is also provided at the second lateral side, the attachment plate may comprise two second engaging elements at the second lateral side.

According to an embodiment, the eccentric stud is insertable through the through-hole and the opening of the first support beam in an insertion direction. Therein a circumference of the eccentric stud varies along the insertion direction from an insertion end of the eccentric stud to a base end of the eccentric stud. The insertion direction may correspond and/or be parallel to the turning axis of the eccentric stud in the operating position. The insertion end of the eccentric stud may be provided at a tip of the eccentric stud that is inserted into the through-hole and the opening of the first support beam first. The base end may be larger than the rest of the eccentric stud and may be an end of the eccentric stud that is not inserted into the through-hole. In the operating position, the base end may still be arranged at the side of the attachment plate from which the eccentric stud is originally inserted into the through-hole. The circumference refers to an outer diameter of the eccentric stud in a direction perpendicular to the insertion direction. Because the circumference of the eccentric stud is different along its insertion direction, the eccentric stud may provide different functionalities at different sections along its insertion direction.

According to a further development of this embodiment, the circumference of the eccentric stud at its base end is larger than an inner diameter of the through-hole of the attachment plate. Herein, an eccentric section of the eccentric stud adjoins the base end and comprises an eccentric circumference. In this embodiment, the eccentric stud comprises at least one section at the base end comprising a large circumference which is adjoined by the eccentric section of the eccentric stud comprising the eccentric circumference. The eccentric stud may be inserted into the through-hole up to the base end of the eccentric stud. In the operating position, the base end of the eccentric stud may abut the attachment plate. Thus, the eccentric section of the eccentric stud is located within the through-hole of the attachment plate providing the functionality described above. The base end of the eccentric stud provides an abutting function that enables and/or simplifies a predetermined alignment of the eccentric stud within the through-hole of the attachment plate.

Additionally or alternatively, the eccentric stud comprises a mounting section adjoining the insertion end. The mounting section is arranged in the opening of the first support in an operating position, wherein the insertion end comprises an at least partially larger circumference than the mounting section. The mounting section may comprise a substantially circular outer circumference serving as a bearing for the eccentric stud within the opening of the first support beam. Furthermore, the shape of the mounting section may define the turning axis of the eccentric stud when moving the eccentric stud from its locked position into its unlocked position and vice versa. At the insertion end of the eccentric stud, at least one part may comprise an enlarged circumference to prevent the eccentric stud from being removed unintentionally against the insertion direction and out of the opening of the first support beam. In particular, there may be provided at least one pin at the insertion end of the eccentric stud that ensures that the eccentric stud remains within the opening of the first support beam.

In an embodiment, at least one of the base end and the insertion end of the eccentric stud is adapted to be turned by a standard tool, in particular a screw driver, a wrench or the like. In particular, said end may be provided with a screw slot, a cross screw head, a hexagon socket, and/or an outer hexagonal socket. This implementation enables an easy operation of the turning movement of the eccentric stud by operating said end of the eccentric stud by its corresponding standard tool, thus turning the eccentric stud about its turning axis.

According to an embodiment, the attachment plate is arrangeable inside the first support beam so that the first engaging element engages through and/or past an end cap of the first support beam. Since the attachment plate may be arranged at an end of the first support beam that faces the second support beam, the end cap may be arranged at the end of the first support beam closing said support beam. This may be the case when the first support beam is at least partially hollow. Herein, the attachment plate may be arranged within the hollow support beam near the end cap of the first support beam. In this position, only the first engaging element may protrude from the end of the first support beam through and/or past the end cap of the first support beam providing support for the second support beam. In other words, the first engaging element may be shaped to correspond to the shape of the end cap of the first support beam. Herein, the shape of the end cap may support a stable positioning and/or attaching of the attachment plate at the first support beam.

One aspect relates to a carton flow bed rack comprising at least a side beam and a first end beam, wherein the first end beam is mounted to a first end of the side beam by a first mounting device according to the previous aspect. The attachment plate of the first mounting device is attached to the side beam, the eccentric stud of the first mounting device is inserted into the through-hole of the attachment plate of the first mounting device and a first opening of the side beam, and the first engaging element of the attachment plate of the first mounting device is engaged with a recess of the first end beam.

Herein, the side beam corresponds to the first support beam and the first end beam corresponds to the second support beam as referred to in the previous aspect. The first mounting device is used to connect the side beam and the first end beam.

According to an embodiment, the carton flow bed rack comprises a second end beam, wherein the second end beam is mounted to a second end of the side beam by a second mounting device according to the previous aspect. The attachment plate of the second mounting device is attached to the side beam, the eccentric stud of the second mounting device is inserted into the through-hole of the attachment plate of the second mounting device and a second opening of the side beam, and the first engaging element of the attachment plate of the second mounting device is engaged with a recess of the second end beam.

In other words, the side beam comprises two ends. At both of said ends, a mounting device according to the first aspect is connecting said ends to an respective end beam. The mounting device may be used to further connect the side beam at both the loading side of the carton flow bed rack and at the unloading side of the carton flow bed rack. The mounting device is in particular versatile in that it may be used to connect the side beam at both opposite ends to different kinds of end beams, in particular to a loading end beam and to an unloading end beam.

In a further development of this embodiment, the first mounting device is identical to the second mounting device, and the first end beam is arranged at the first end of the side beam, the second end beam is arranged at the second end of the side beam, and the first end beam is arranged at a different height than the second end beam. The height may be measured relative to the respective end of the side beam. In other words, identical mounting devices comprising identical attachment plates and identical eccentric studs are mounted to the side beam and provide connections for the two end beams at different heights. The attachment plate may be arranged at the side beam with different flat surfaces facing the side beam, thereby arranging different engaging elements to protrude from the respective end of the side beam towards the respective end beam.

An aspect relates to a method for connecting two support beams of a rack, in particular of a carton flow bed rack, comprising the steps of:
  arranging an attachment plate with a first flat side facing a first of the two support beams;
  arranging a through-hole of the attachment plate adjacent an opening of the first support beam;
  inserting an eccentric stud into both the through-hole of the attachment plate and the opening of the first support beam;
  engaging at least one first engaging element with a recess of a second of the two support beams; and
  adjusting a position of the first engaging element in the recess of the second support beam by turning the eccentric stud.

The method may be realized by a mounting device according to the first aspect.

Embodiments of the invention are described with reference to the figures. Features of the embodiments shown in the figures may be combined with each other and/or further embodiments. Identical reference numbers identify identical or similar features of the embodiments.

DETAILED DESCRIPTION

Figure 1:
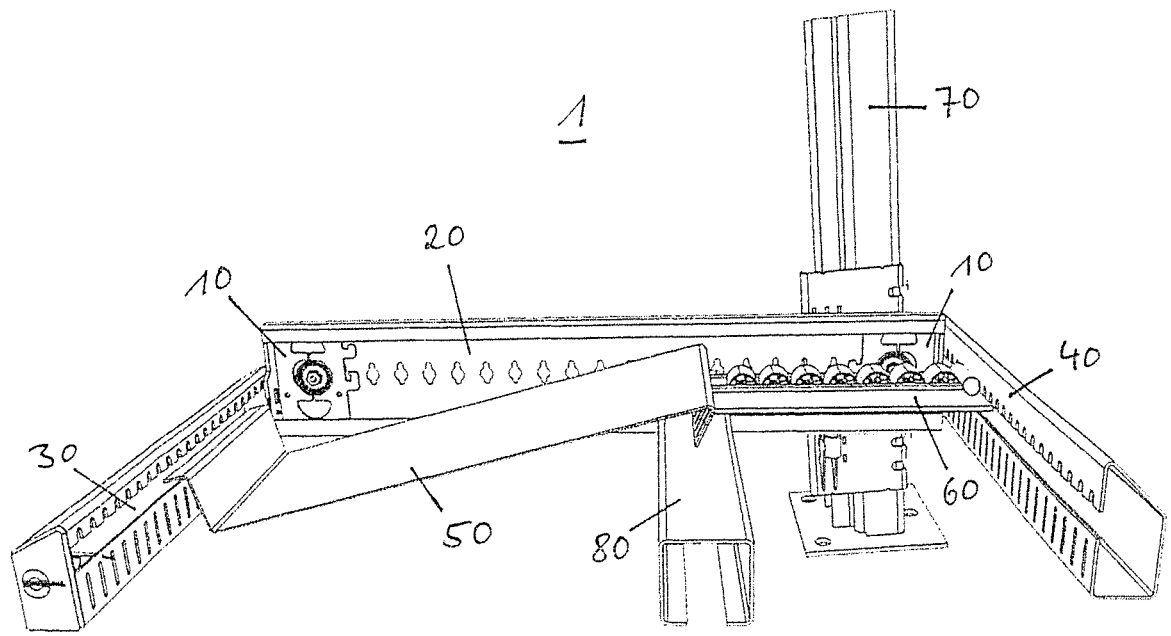
FIG. 1 a perspective view of a carton flow bed rack wherein beams are connected by a mounting device.

FIG. 1 shows a perspective view of a carton flow bed rack 1 wherein three different support beams are connected by two mounting devices 10. Not all but only some elements of the carton flow bed rack 1 are shown to enable a better view of the different elements.

The carton flow bed rack 1 is supported by at least one support pole 70 arranged in a substantially vertical direction. A base of the support pole 70 abuts the floor and supports the weight of the carton flow bed rack 1 at least partially. The carton flow bed rack 1 may comprise multiple support poles 70, in particular at least four support poles 70 arranged at the four corners of the substantially cubic carton flow bed rack 1.

The support pole 70 is connected to at least one side beam 20. The side beam 20 is implemented as a support beam and aligned in a substantially horizontal direction. Herein, the side beam 20 may be arranged at an inclination angle of about 1° to about 10°, e.g. of about 5°, from its upper side at the load end to its lower side at the unload end. The side beam 20 is aligned substantially perpendicular to the support pole 70. FIG. 1 shows only a single side beam 20 at a far side of the carton flow bed rack 1. In the carton flow bed rack 1, a corresponding side beam at the opposite side of the carton flow bed rack 1, namely the side facing the viewer of FIG. 1, is omitted. Furthermore, the carton flow bed rack 1 shown in FIG. 1 comprises only a single level, similar to a rack comprising a single shelf. However, different embodiments of the carton flow bed rack may comprise a plurality of levels arranged substantially above each other in a vertical direction. In these carton flow bed racks, the at least one support pole 70 may support a plurality of side beams 20 arranged above each other.

At a first end of the side beam 20, in particular at its unload end, the side beam 20 is connected to an unload beam 30. The unload beam 30 is arranged in a substantially horizontal direction and substantially perpendicular to the side beam 20.

At the opposite end of the side beam 20, in particular at its load end, the side beam 20 is connected to a load beam 40. The load beam 40 is arranged substantially horizontal and substantially perpendicular to the side beam 20.

At each of said two ends of the side beam 20, a mounting device 10 is arranged to enable the connection with the respective further support beam, namely the load beam 40 or the unload beam 30. In other words, two mounting devices 10 are arranged at and/or attached to the two ends of the side beam 20. The functionality and further details of the mounting device 10 are explained in reference to the following figures.

Between the load beam 40 and the unload beam 30, the carton flow bed rack 1 comprises at least one intermediate beam 80 arranged substantially parallel to both the load beam 40 and the unload beam 30. The side beam 20, the load beam 40, the unload beam 30 and the intermediate beam 80 define and support a single level of the carton flow bed rack 1.

Between the load beam 40 and the intermediate beam 80, the carton flow bed rack 1 comprises at least one wheel track 60. The wheel track 60 comprises a plurality of wheels and/or rolls that support transporting a load, in particular a parcel and/or a carton, loaded onto the wheel track 60 at the load beam 40. The wheel track 60 is shown truncated and may be implemented longer, in particular some meters long. The wheel track 60 may comprise an inclination from the load side to the intermediate beam 80.

Supported by both the intermediate beam 80 and the unload beam 30, an unload tray 50 is arranged. The unload tray 50 abuts the wheel track 60 at the intermediate beam 80. A load, which is loaded onto the wheel track 60 at the load beam 40, may be transported by gravity by the inclinated wheel track 60 to the intermediate beam 80 where it is transferred to the unload tray 50. The unload tray 50 is arranged in a tilted manner comprising an inclination that enables a sliding movement of a load from the higher end of the unload tray 50, arranged at the intermediate beam 80, towards the lower end of the unload tray 50, arranged at the unload beam 30. At said lower end of the unload tray 50, the unload beam 30 may provide a stop that limits further transportation of the load. Thus, the load may rest upon the unload tray 50 until it is unloaded at the unload beam 30.

The load beam 40 and the unload beam 30 provide end beams of the carton flow bed rack 1. The side beam 20, the load beam 40 and the unload beam 30 provide support beams of the carton flow bed rack 1.

Different carton flow bed racks may comprise a plurality of wheel tracks 60 arranged substantially parallel to each other and/or a plurality of unload trays 50 at the same level. In these carton flow bed racks, a plurality of loads, in particular parcels and/or cartons, may be loaded at the load side in parallel, namely the side which ends at the load beam 40. The shown carton flow bed rack 1 supports loading cartons from one side (the load side) and unloading them from the opposite side (the unload side) of the carton flow bed rack 1. This build of the carton flow bed rack is sometimes referred to as FIFO—'first in first out'. In different embodiments, carton flow bed racks may support loading and unloading at the same side. These builds of the carton flow bed rack are sometimes referred to as LIFO—'last in first out'. The invention may be implemented as a LIFO and/or as a FIFO carton flow bed rack. A LIFO carton flow bed rack may be implemented without any unload tray 50, because each level of the carton flow bed rack will be loaded and unloaded at the same end beam. Therefore, in a LIFO carton flow bed rack, the loads may only be supported by wheel tracks 60 arranged between both opposite end beams. In another embodiment of a FIFO carton flow bed rack without unload tray, the loads may also be only supported by wheel tracks 60 between the load beam(s) and the respective unload beam(s).

At the ends of the side beam 20, the mounting devices 10 are arranged to enable the connections to the end beams 30, 40. Here, the mounting devices 10 may be identical. As shown in FIG. 1, the load beam 40 is arranged at the load end of the side beam 20 at a different height than the unload beam 30 at the unload end of the side beam 20. In the shown embodiment of the carton flow bed rack 1, the unload beam 30 is arranged lower than the load beam 40. However, both different height positions and/or installation heights of the respective end beams 30, 40 are supported and enabled by identical mounting devices 10.

Figure 2:
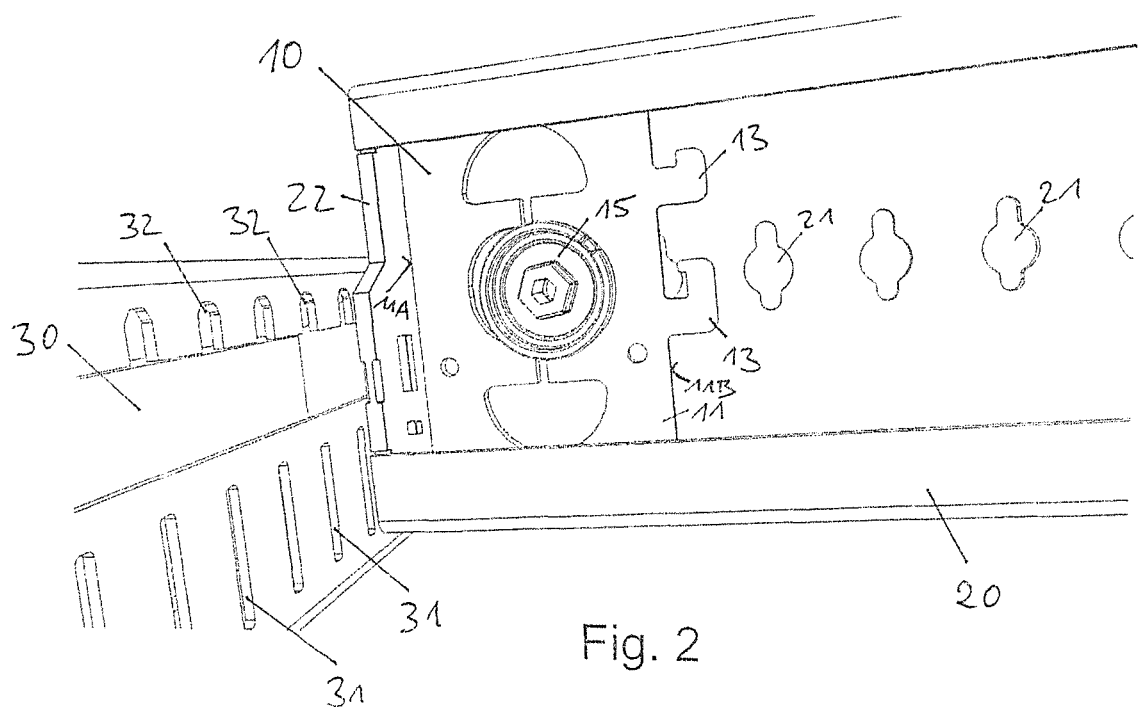
FIG. 2 an enlarged detail view of the carton flow bed rack of FIG. 1, showing the mounting device connecting a side beam to an end beam.

FIG. 2 shows an enlarged detail of the carton flow bed rack 1. In particular, FIG. 2 shows the end of the side beam 20 that is connected to the unload beam 30 by the mounting device 10. The mounting device 10 comprises an attachment plate 11 that is arranged with a first flat side facing the side beam 20. The mounting device 10 further comprises an eccentric stud 15 inserted into a through-hole of the attachment plate 11 and into an opening 21 of the side beam 20. The side beam 20 comprises a plurality of such openings 21 arranged substantially equidistantly from each other in a substantially horizontal direction along its substantially vertically aligned flat surface.

At the unload end of the side beam 20 facing the unload beam 30, an end cap 22 is arranged. The side beam 20 is provided as an at least partially hollow profile, wherein the cross section of the side beam 20 is mostly hollow and at least partially surrounded by the e.g. metallic structure forming the side beam 20. The implementation of the profile as at least partially hollow increases the stability of the respective beam. The mounting device 10 is arranged within the hollow profile of the side beam 20.

At two lateral sides of the attachment plate 11, engaging elements 12, 13 are provided. FIG. 2 shows second engaging elements 13 provided at a second lateral side of the attachment plate 11 that is facing away from the unload beam 30. However, covered by the end cap 22, the attachment plate 11 further comprises first engaging elements 12 that engage into recesses 31 and 32 of the unload beam 30. The first engaging elements 12 are arranged at a first lateral side of the attachment plate 11 and are shaped similar to the second engaging elements 13 which are shown in FIG. 2.

The unload beam 30 may also be provided as a hollow profile comprising a row of upper recesses 32 and a row of lower recesses 31. Both kinds of recesses 31 and 32 are provided as substantially vertically aligned slots comprising a closed upper rim. This closed upper rim of the respective slots provides a support point that is supported by the first engaging elements 12 at the first lateral side of the attachment plate 11 facing the unload beam 30.

Figure 3:
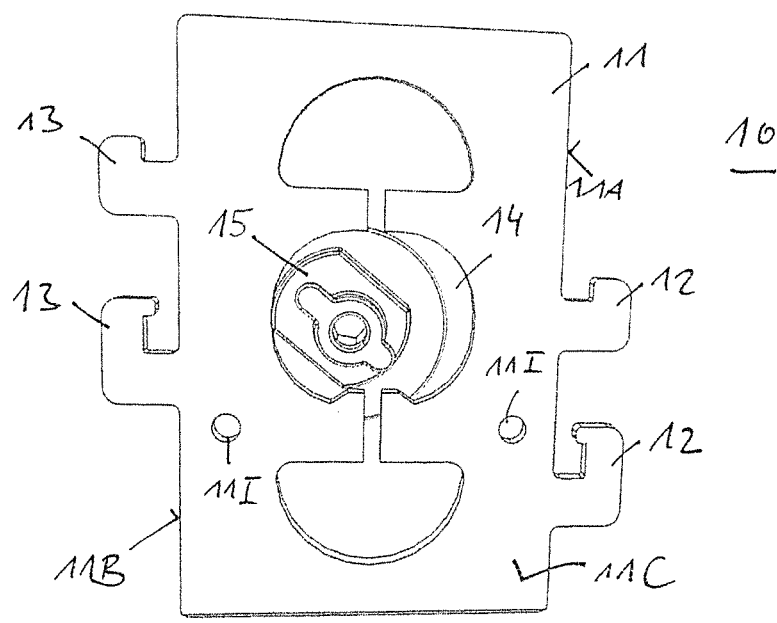
FIG. 3 a side view of a first flat side of an attachment plate of a mounting device in which an eccentric stud is inserted.

FIG. 3 shows the mounting device 10 in more detail, namely a side view of a first flat side 11C of the attachment plate 11 comprising a through-hole 14. FIG. 3 shows the mounting device 10 from the flat side facing away from the viewer of FIG. 2. FIG. 3 shows the first flat side 11C that is facing the side beam 20 in FIG. 2.

The mounting device 10 comprises substantially two elements, namely the attachment plate 11 and the eccentric stud 15.

Figure 4:
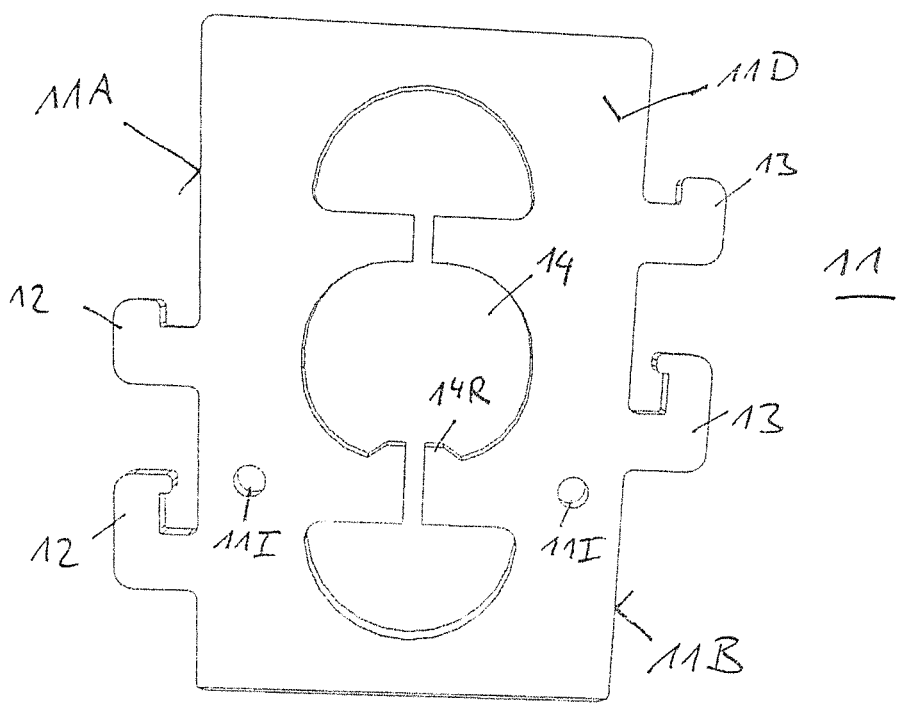
FIG. 4 a side view of a second flat side of an attachment plate of a mounting device.

FIG. 4 shows a side view of a second flat side 11D of the attachment plate 11 without the eccentric stud 15. FIG. 3 and FIG. 4 show the attachment plate 11 from its two opposite flat sides 11C and 11D. The attachment plate 11 is shaped substantially rectangular. In its operating position, the attachment plate 11 is arranged in a substantially vertically aligned plane and substantially parallel to the side beam 20. In its operating position, either the first flat side 11C or the second flat side 11D faces the side beam 20. Depending on which of its flat sides 11C or 11D faces the side beam 20, and depending on whether the mounting device 10 is mounted on a left or right end of the side member 20, either a first lateral side 11A of the attachment plate 11 or a second lateral side 11B of the attachment plate 11 faces towards the further beam that is supposed to be connected to the side beam 20. For example, as shown in FIG. 2, the attachment plate 11 is arranged at the side beam 20 so that its first lateral side 11A is arranged adjacent the end cap 22 and/or facing the unload beam 30.

In the embodiment shown in FIGS. 3 and 4, the attachment plate 11 comprises the two lateral sides 11A and 11B on which first and second engaging elements 12 and 13 are arranged. At the first lateral side 11A, two first engaging elements 12 are arranged. At the second lateral side 11B, two second engaging elements 13 are arranged. The engaging elements 12 and 13 protrude from their respective lateral side 11A, 11B of the attachment plate 11 and are shaped substantially like hooks. The engaging elements 12, 13 are intended to engage with the recesses 31 and 32 of the unload beam 30 (see FIG. 2) or with similar recesses of the load beam 40 (see FIG. 1).

While the upper and lower side of the attachment plate 11 are substantially smooth, its both lateral sides 11A, 11B comprise the engaging elements 12 and 13. The smooth shape of the upper and lower ends/sides of the attachment plate 11 enable an aligned arrangement within the hollow side beam 20. Here, the terms upper and lower refer to the reference system of the Earth.

The engaging elements 12, 13 protrude from their respective lateral side 11A and 11B in a substantially horizontal direction towards a bend and/or a knee. At said bend and/or knee, they change their alignment in a substantially vertically, upwards directed alignment. Thus, the engaging elements 12, 13 provide sufficient grip and stability within the recesses 31 and 32 to fix the beams together.

As shown in FIGS. 3 and 4, the first engaging elements 12 are arranged at a lower vertical height at the first lateral side 11A than the second engaging elements 13 are arranged at at the second lateral side 11B. Thus, the attachment plate 11 provides two different available installation heights for the end beam 30, 40.

As shown in FIG. 1, at the unload end of the side beam 20, the attachment plate 11 is arranged with its first flat side 11C facing the side member 20, so that the first engaging elements 12 are arranged at the connection edge. Thus, the unload beam 30 is arranged at a lower installation height than the side beam 20. At the load end of the side beam 20, the attachment plate 11 is also arranged with its first flat side 11C facing the side beam 20. However, here the second lateral side 11B with the second engaging elements 13 face the connection edge and the load beam 40. Thus, the load beam 40 is arranged at a higher installation height than the unload beam 30, e.g. at the same height as the side beam 20.

Depending on the orientation of the attachment plate relative to the side beam 20, in particular depending on which of its flat sides 11C or 11D faces the side member 20, the alignment of the attachment plate 11 defines the connection height and/or the installation height for the respective end beam 30, 40.

As shown in FIG. 4, the substantially rectangular attachment plate 11 comprises at least one through-hole 14. Here, the through-hole 14 is arranged substantially at the center of the attachment plate 11. The through-hole 14 is substantially circular shaped. However, at one section, it comprises a section 14R with a reduced inner diameter. This section 14R with the reduced inner diameter provides a working surface and a contact surface for the eccentric stud 15 to interact with. In particular, the section 14R may limit and/or stop the rotation of the eccentric stud 15 at a predetermined position. As shown in FIG. 4, the attachment plate 11 may comprise further recesses and/or holes that may increase the stability of the attachment plate 11 and/or that may allow a (e.g. controlled and/or predetermined) deformation of the attachment plate 11. Said deformation may balance cumulated tolerances of the components with respect to the specific assembly and may increase the stability of the assembly due to the spring effect.

Figure 5A:
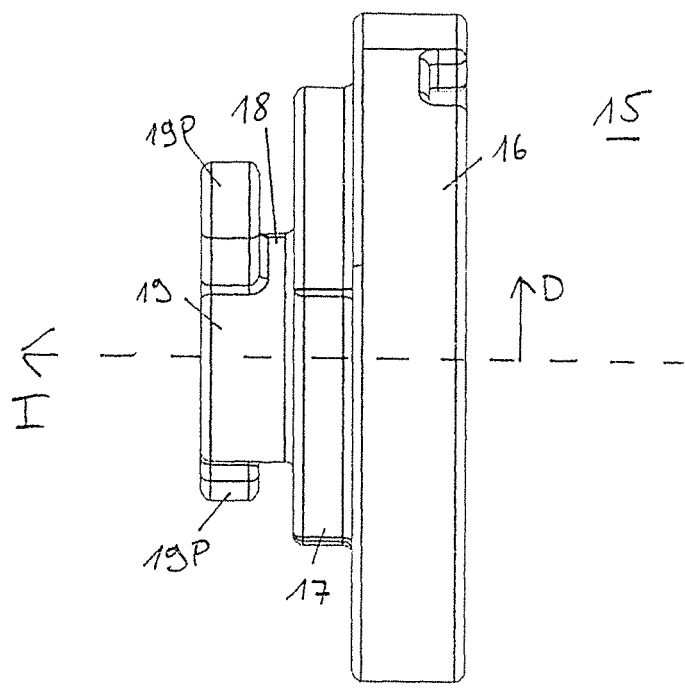
FIG. 5A a side view of an eccentric stud of a mounting device.
Figure 5B:
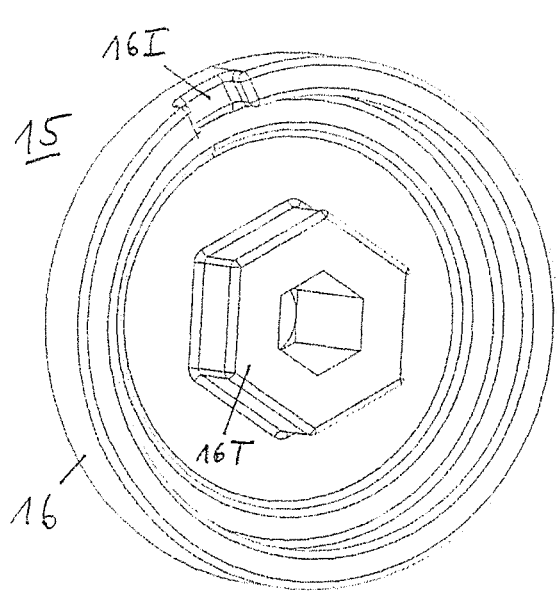
FIG. 5B a perspective view of a base end of an eccentric stud.
Figure 5C:
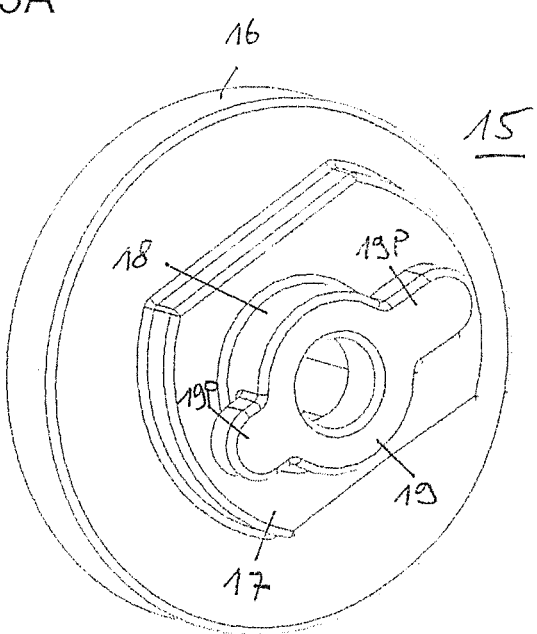
FIG. 5C a perspective view of an insertion end of an eccentric stud.

FIGS. 5A, 5B, and 5C show the eccentric stud 15 from different perspectives. FIG. 5A shows a side view of the eccentric stud 15. FIG. 5A shows the side view from a direction that is substantially perpendicular to its insertion direction I. The eccentric stud 15 extends from its insertion end 19 to its base end 16 along its insertion direction I. Along its insertion direction I, the eccentric stud 15 comprises different circumferences and/or outer diameters. Here, the diameters are measured in a diameter direction D substantially perpendicular to the insertion direction I. The insertion direction I corresponds to the direction along which the eccentric stud 15 is inserted into the through-hole 14 and the opening 21 of the side beam 20.

As shown in FIG. 5A, the eccentric stud 15 comprises its largest diameter at its base end 16. The base end 16 is too large to fit through the through-hole 14 and will, thus, remain at the side of the attachment plate 11 from which the eccentric stud 15 is inserted into the through-hole 14. This is also shown in FIGS. 2 and 3.

Adjoining the base end 16, the eccentric stud 15 comprises an eccentric section 17. The eccentric section 17 comprises an eccentric outer diameter. On other words, the outer diameter at the eccentric section 17 is larger on one side than on another side. This is also shown in FIG. 5C. The eccentric section 17 interacts with the through-hole 14 of the attachment plate, in particular with the section 14R comprising the reduced diameter (see FIG. 4).

As shown in FIG. 5A, between the insertion end 19 and the eccentric section 17, the eccentric stud 15 comprises a mounting section 18. The mounting section 18 comprises the smallest diameter. The mounting section 18 is designed to be arranged within the opening 21 of the side beam 20 in the operating position. The mounting section 18 has a substantially circular shape (see also FIG. 5C). The circular outer shape of the mounting section 18 corresponds to a substantially circular inner shape of the openings 21 of the side beam 20.

At the insertion end 19 of the eccentric stud, the eccentric stud 15 comprises at least one pin 19P, preferably two pins 19P at opposite sides of the insertion end 19 (see FIG. 5C). The pins 19P extend from the insertion end 19 in a substantially perpendicular direction to the insertion direction I, e.g. substantially parallel to the diameter direction D. The two pins 19P may extend in a direction opposite to the insertion end 19.

FIG. 5B shows a view of the base end 16. The base end 16 comprises a turn head 16T at its center. In the shown embodiment, the turn head 16T comprises both an inner and an outer hexagonal shape that may be operated by a standard tool like a wrench and/or a hex key.

Figure 6:
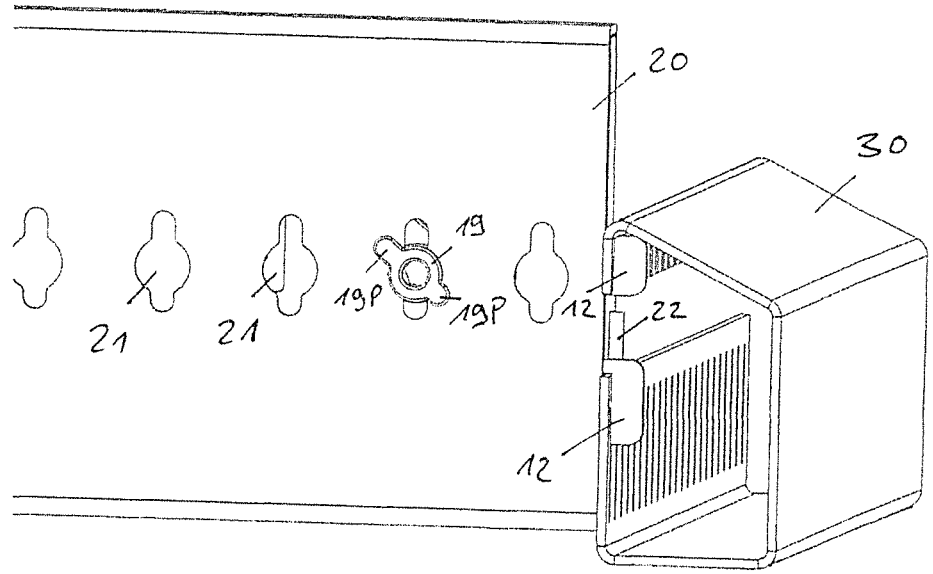
FIG. 6 a perspective rear view of a mounting device connecting a side beam to an end beam.

FIG. 6 shows a perspective rear view at the connected beams 20 and 30. Here, only the tip, namely the insertion end 19, of the eccentric stud 15 protrudes from the back side of the side beam 20. The eccentric stud 15 is turned into a position wherein the pins 19P prevent the eccentric stud from moving out of the opening 21 against the insertion direction I. To enable an easy insertion of the insertion end 19 comprising the pins 19P, the openings 21 are substantially circular shaped comprising wing-like extensions that enable access for the pins 19P.

FIG. 6 further shows the first engaging elements 12 protruding past the end cap 22 of the side beam 20 into the hollow profile of the unload beam 30 where they support the weight of the unload beam 30.

Figure 7:
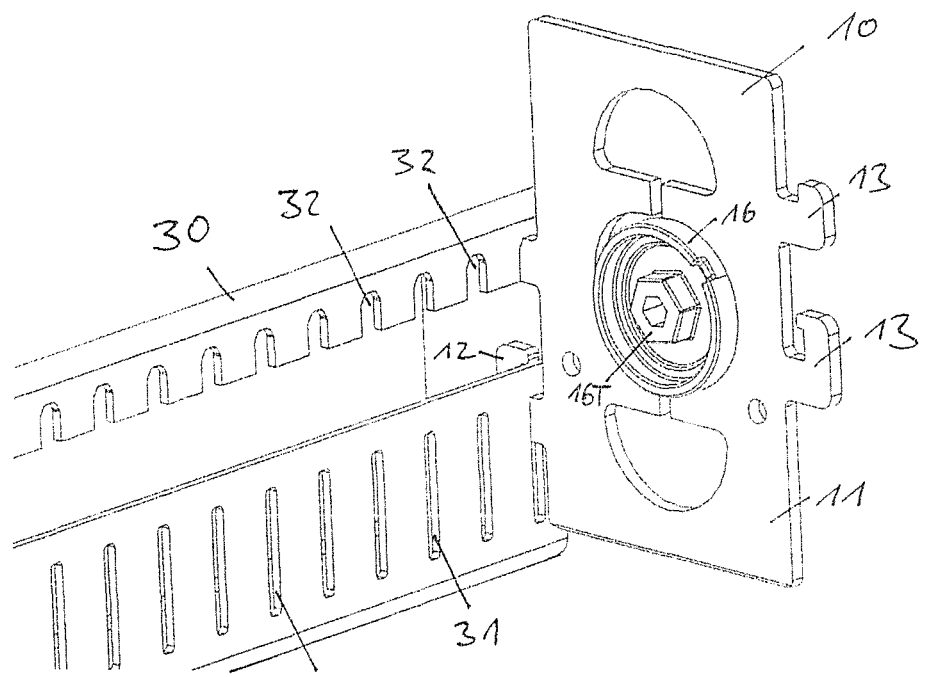
FIG. 7 a perspective view of a mounting device engaging an end beam.

FIG. 7 shows a perspective view of the mounting device 10 engaging with the unload beam 30 as end beam. In FIG. 7, the end cap 22 and the side beam 20 are omitted. The two first engaging elements 12 are engaged with one of the upper recesses 32 and with one of the lower recesses 31, respectively. In this position, turning the base end 16 of the eccentric stud 15, e.g. by turning it by use of a wrench and/or a hexagonal key, adjusts the position of the eccentric section 17 within the through-hole 14 of the attachment plate 11.

Whenever the eccentric section 17 is oriented so that its side with the largest outer diameter faces the section 14R with the reduced diameter of the inner through-hole 14, the position of the attachment plate 11 relative to the side beam 20 is amended, e.g. lowered. In this lowered position, the first engaging elements 12 may easily be inserted into the recesses 31 and 32. When the eccentric stud 15 is shifted into another position, e.g. into the position shown in FIG. 3, wherein the largest diameter of the eccentric section 17 faces away from the section 14R, the position of the attachment plate 11 relative to the side beam 20 is shifted. Here, the whole attachment plate 11 is lifted upwards in its locked position. In this locked position, the first engaging elements 12 are locked within the recesses 31, 32 of the unload beam 30. The actual height of the engaging elements 12 and/or 13 in the locked position may depend on the actual orientation of the eccentric section 17 within the through-hole 14. In the locked position, the connection between the two beams, namely the side beam 20 and the unload beam 30, may be fixed as long as the eccentric stud 15 is not turned again into its unlocked position.

The eccentric stud 15 may comprise an indicator 16I, in particular at its base end 16 (see FIG. 5B). The position of the indicator 16B indicates the actual orientation of the eccentric section 17 and, thus, the locked and/or unlocked position of the eccentric stud 15 when viewed upon from its base end 16. The indicator 16I may e.g. be implemented as a recess and/or as a marker.

As shown in, e.g., FIG. 4, the attachment plate 11 may comprise an indicator 11I to indicate the orientation of the attachment plate 11. The indicator 11I may be implemented as at least one hole, and/or at least one protrusion, and/or as at least one (e.g. colored) marker that shows the orientation of the attachment plate 11.

The mounting device 10 enables a simple, durable and fast assembly of the carton flow bed rack 1.

LIST OF REFERENCE NUMERALS 1 carton flow bed rack
10 mounting device
11 attachment plate
11A first lateral side
11B second lateral side
11C first flat side
11D second flat side
11I indicator
12 first engaging element
13 second engaging element
14 through-hole
14R section with reduced diameter
15 eccentric stud
16 base end
16I indicator
16T turn head
17 eccentric section
18 mounting section
19 insertion end
19P pin
20 side beam
21 opening
22 end cap
30 unload beam
31 lower recess
32 upper recess
40 load beam
50 unload tray
60 wheel track
70 support pole
80 intermediate beam
I insertion direction
D diameter direction

What is claimed is:

1. A mounting device (10) for connecting first and second support beams (20, 30, 40) of a carton flow bed rack (1) the first support beam (20) having opposite first and second surfaces, comprising:
   an attachment plate (11) arranged adjacent the first surface of the first support beam (20) and comprising:
      a through-hole (14) arrangeable adjacent an opening (21) of the first support beam (20), and
      at least one first engaging element (12) for engaging with a recess (31, 32) of the second support beam (30; 40) when the attachment plate (11) is arranged with a first flat side (11C) of the attachment plate (11) facing the first surface of the first support beam (20); and
   an eccentric stud (15) insertable through the through-hole (14) of the attachment plate (11) and through the opening (21) of the first support beam (20) in an insertion direction (I), the eccentric stud (15) having a circumference that varies along the insertion direction (I) from an insertion end (19) of the eccentric stud (15) to a base end (16) of the eccentric stud (15), the eccentric stud (15) further comprising a mounting section (18) adjoining the insertion end (19) and arranged in the opening (21) of the first support beam (20) in an operating position, wherein at least part of the insertion end (19) protrudes from the second surface of the first support beam (20) in the operating position and has a larger circumference than the mounting section (18);
   wherein turning the eccentric stud (15) adjusts a position of the first engaging element (12) in the recess (31, 32) of the second support beam (30; 40).

2. The mounting device of claim 1, wherein the through-hole (14) comprises a section (14R) with a reduced inner diameter interacting with an eccentric outer diameter of the eccentric stud (15) inserted into the through-hole (14).

3. The mounting device of claim 1, wherein the first engaging element (12) is arranged at a first lateral side (11A) of the attachment plate (11).

4. The mounting device of claim 3, wherein at least one second engaging element (13) is arranged at a second lateral side (11B) of the attachment plate (11), and wherein the second engaging element (13) is for engaging with the recess (31, 32) of the second support beam (30; 40) when the attachment plate (11) is arranged with a second flat side (11B) facing the first support beam (20).

5. The mounting device of claim 4, wherein the second engaging element (13), which is arranged on the second lateral side (11B) of the attachment plate (11), is arranged at a different height than the first engaging element (12), which is arranged on the first lateral side (11B) of the attachment plate (11).

6. The mounting device of claim 1, wherein the attachment plate (11) comprises two first engaging elements (12) for respectively engaging with two recesses (31, 32) of the second support beam (30; 40), and wherein the two first engaging means (12) are spaced from each other.

7. The mounting device of claim 1, wherein the circumference of the eccentric stud (15) at its base end (16) is larger than an inner diameter of the through-hole (14) of the attachment plate (11), and wherein an eccentric section (17) of the eccentric stud (15) adjoins the base end (16) and comprises an eccentric circumference.

8. The mounting device of claim 1, wherein at least one of the base end (16) and the insertion end (19) of the eccentric stud (15) is adapted to be turned by a standard tool.

9. The mounting device of claim 1, wherein the attachment plate (11) is arrangeable inside the first support beam (20) so that the first engaging element (12) engages through or past an end cap (22) of the first support beam (20).

10. A carton flow bed rack (1), comprising at least a side beam (20) and a first end beam (30), wherein the first end beam (30) is mounted to a first end of the side beam (20) by the mounting device (10) of claim 1, and wherein:
the attachment plate (11) of the mounting device (10) is attached to the side beam (20),
the eccentric stud (15) of the mounting device (10) is inserted into the through-hole (14) of the attachment plate (11) of the mounting device (10) and a first opening (21) of the side beam (20), and
the first engaging element (12) of the attachment plate (11) of the mounting device (10) is engaged with a recess (31, 32) of the first end beam (30).

11. The carton flow bed rack (1) of claim 10, wherein the mounting device is a first mounting device and the carton flow bed rack (1) further comprising a second end beam (40), wherein the second end beam (40) is mounted to a second end of the side beam (20) by a second mounting device (10), and wherein:
the second mounting device (10) has an attachment plate attached to the side beam (20),
the second mounting device (10) having an eccentric stud inserted into the through-hole of the attachment plate of the second mounting device (10) and a second opening (21) of the side beam (20), and
the attachment plate of the second mounting device (10) has an engaging element engaged with a recess of the second end beam (40).

12. The carton flow bed rack of claim 11, wherein the first mounting device (10) is identical to the second mounting device (10), and wherein the first end beam (30) is arranged at the first end of the side beam (20), the second end beam (40) is arranged at the second end of the side beam (20), and the first end beam (30) is arranged at a different height than the second end beam (40).

13. A method for connecting first and second support beams (20; 30; 40) of a carton flow bed rack (1), the first support beam (20) having opposite first and second surfaces, the method comprising the steps of:
arranging an attachment plate (11) with a first flat side (11C) facing the first surface of the first support beam (20);
arranging a through-hole (14) of the attachment plate (11) adjacent an opening (21) of the first support beam (20);
inserting an eccentric stud (15) into both the through-hole (14) of the attachment plate (11) and the opening (21) of the first support beam (20) in an insertion direction (I), the eccentric stud (15) being configured so that a circumference of the eccentric stud (15) varies along the insertion direction (I) from an insertion end (19) of the eccentric stud (15) to a base end (16) of the eccentric stud (15), the eccentric stud (15) further comprising a mounting section (18) adjoining the insertion end (19) and arranged in the opening (21) of the first support beam (20) in an operating position, wherein at least part of the insertion end (19) protrudes from the second surface of the first support beam (20) in the operating position has a larger circumference than the mounting section (18); and the method further comprising:
engaging at least one first engaging element (21) with a recess (31, 32) of a second support beam (30; 40); and
adjusting a position of the first engaging element (12) in the recess (31, 32) of the second support beam (30; 40) by turning the eccentric stud (15).

\* \* \* \* \*